(12) United States Patent
Brown et al.

(10) Patent No.: US 8,591,205 B2
(45) Date of Patent: Nov. 26, 2013

(54) CENTERING COUPLING FOR SPLINED SHAFTS SUBMERSIBLE PUMPING SYSTEMS AND ELECTRICAL SUBMERSIBLE PUMPS

(71) Applicant: Baker Hughes Incorporated, Houston, TX (US)

(72) Inventors: Donn J. Brown, Tulsa, OK (US); Brown Lyle Wilson, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/657,986

(22) Filed: Oct. 23, 2012

(65) Prior Publication Data

US 2013/0101447 A1    Apr. 25, 2013

Related U.S. Application Data (63) Continuation of application No. 12/332,717, filed on Dec. 11, 2008, now abandoned, which is a continuation-in-part of application No. 12/125,350, filed on May 22, 2008, now abandoned.

(51) Int. Cl.
  *F16B 7/00* (2006.01)
  *F16B 12/36* (2006.01)
  *F16B 13/00* (2006.01)

(52) U.S. Cl.
  USPC .................. 417/423.6; 403/293; 403/305

(58) Field of Classification Search
  USPC ............... 417/423.6; 403/292, 293, 297, 298,
  403/305, 306, 355, 359.1, 359.5, 359.6,
  403/371, 395
  See application file for complete search history.

(56) References Cited

U.S. PATENT DOCUMENTS

| | | | |
|---|---|---|---|
| 1,469,304 A | 10/1923 | Hughes | |
| 2,171,355 A * | 8/1939 | Cole | 209/326 |
| 2,527,294 A | 11/1950 | Bailey | |
| 2,643,861 A | 6/1953 | Losey | |
| 3,613,783 A | 10/1971 | Seabourn | |
| 4,209,891 A | 7/1980 | Lamb | |
| 4,286,894 A | 9/1981 | Rongley | |
| 4,484,407 A | 11/1984 | Petersson | |
| 5,219,449 A | 6/1993 | Hoshino | |
| 5,921,750 A | 7/1999 | Gatz | |
| 6,409,428 B1 | 6/2002 | Moog | |
| 6,602,059 B1 * | 8/2003 | Howell et al. | 417/423.3 |
| 6,752,560 B2 | 6/2004 | Wilson | |
| 6,883,604 B2 | 4/2005 | Mack | |
| 7,011,159 B2 | 3/2006 | Holland | |
| 2007/0034381 A1 | 2/2007 | Campbell | |
| 2009/0291001 A1 | 11/2009 | Neuroth | |
| 2009/0291003 A1 | 11/2009 | Brown | |

OTHER PUBLICATIONS

Related U.S. Appl. No. 12/332,717, filed Dec. 11, 2008.

* cited by examiner

*Primary Examiner* — Peter J Bertheaud
(74) *Attorney, Agent, or Firm* — Bracewell & Giuliani LLP (57) ABSTRACT

A submersible pumping system, electrical submersible pump, and method of providing enhanced alignment of motor and driven shafts of submersible pumping systems and electrical submersible pumps, are provided. An example of an electrical submersible pump system includes a pump, a pump motor, and a seal section. The motor drives the pump via motor and driven shafts rotatingly coupled with a coupling assembly. The coupling assembly maintains the shaft ends in coaxial alignment with an alignment device. The alignment device is profiled on opposite ends for mating engagement with the centering profiles extending into the shaft ends.

22 Claims, 7 Drawing Sheets

CENTERING COUPLING FOR SPLINED SHAFTS SUBMERSIBLE PUMPING SYSTEMS AND ELECTRICAL SUBMERSIBLE PUMPS

RELATED APPLICATIONS

This application is a continuation of and claims priority to and the benefit of U.S. patent application Ser. No. 12/332,717, filed Dec. 11, 2008, which is a continuation-in-part of and claims priority to and the benefit of U.S. patent application Ser. No. 12/125,350, filed May 22, 2008, now abandoned.

BACKGROUND OF THE INVENTION

1. Field of the Invention

This invention relates in general to electrical submersible well pumps, and in particular to couplings between splined shafts of submersible pumping systems and methods of providing enhanced alignment of motor and driven shafts of submersible pumping systems and electrical submersible pumps.

2. Description of the Related Art

Figure 1:
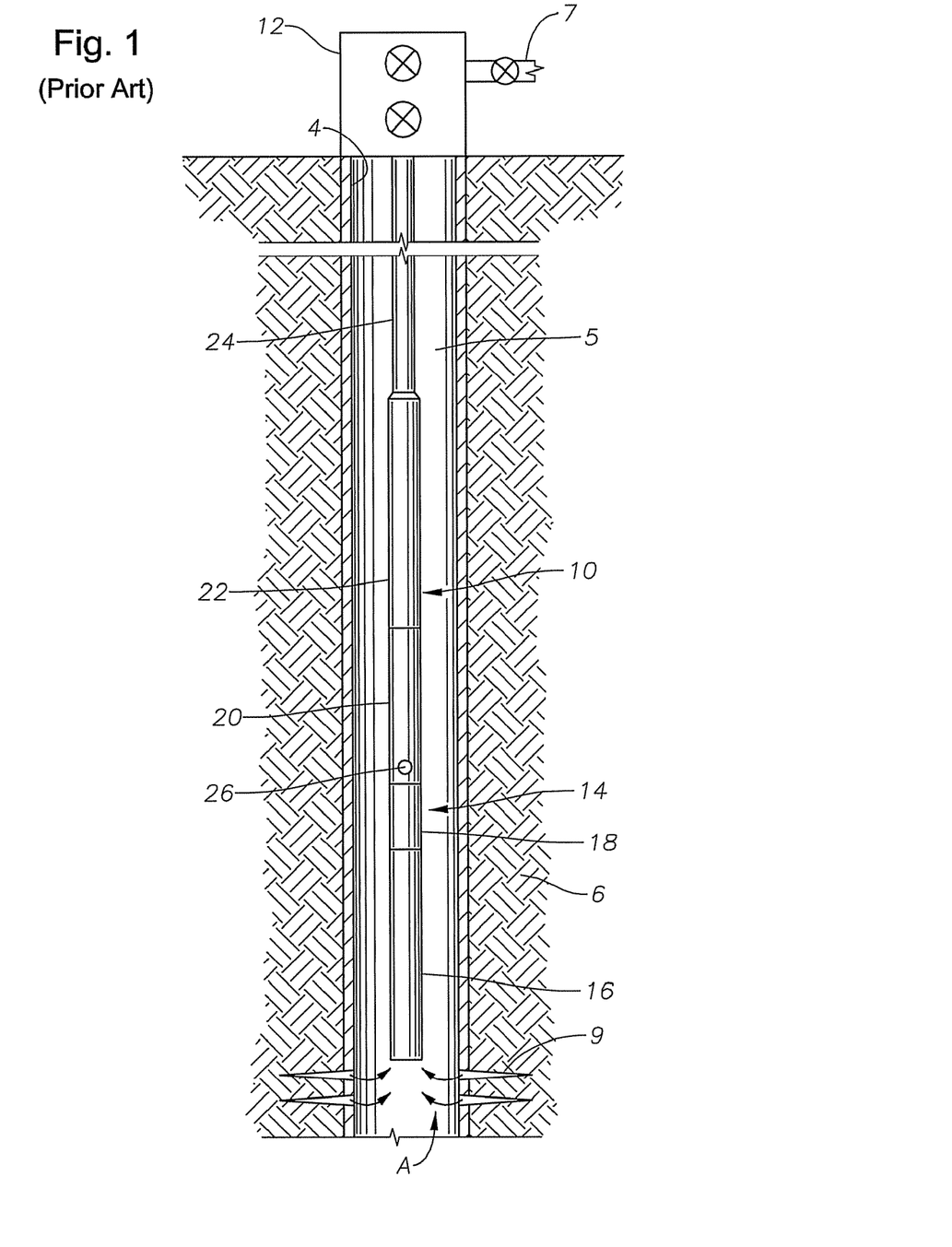
FIG. 1 is a side view of a prior art submersible electrical pumping system in a wellbore.

Electrical submersible pumps (ESP) are commonly used for hydrocarbon well production, FIG. 1 provides an example of a submersible pumping system 10 disposed within a wellbore 5. The wellbore 5 is lined with casing 4 and extends into a subterranean formation 6. Perforations 9 extend from within the wellbore 5 through the casing 4 into the formation 6. Hydrocarbon fluid flow, illustrated by the arrows A, exits the perforations 9 into the wellbore 5, where it can either be pumped by the system 10 or migrate to a wellhead 12 disposed on top of the wellbore 5. The wellhead 12 regulates and distributes the hydrocarbon fluid for processing or refining through an associated production line 7.

The pumping system 10 includes an electrical submersible pump (ESP) 14 with production tubing 24 attached to its upper end. The ESP 14 comprises a motor 16, an equalizer or seal 18, a separator 20, and a pump 22. A fluid inlet 26 is formed in the housing in the region of the ESP 14 proximate to the separator section 20. The fluid inlet 26 provides a passage for the produced hydrocarbons within the wellbore 5 to enter the ESP 14 and flow to the pump 22. Fluid pressurized by the pump 22 is conveyed through the production tubing 24 connecting the ESP 14 discharge to the wellhead 12. The pump 22 and separator 20 are powered by the motor 16 via a shaft (not shown) that extends from the motor 16. The shaft is typically coupled to respective shafts in each of the pump 22, separator 20, and seal 14.

Delivering the rotational torque generated by an ESP motor 16 typically involves coupling a motor shaft (i.e., a shaft connected to a motor or power source) to one end of a driven shaft, wherein the other end of the driven shaft is connected to and drives rotating machinery. Examples of rotating machinery include a pump, a separator, and tandem pumps. One type of coupling comprises adding splines on the respective ends of the shafts being coupled and inserting an annular collar over the splined ends, where the annular collar includes corresponding splines on its inner surface. The rotational force is well distributed over the splines, thereby reducing some problems of stress concentrations that may occur with keys, pins, or set screws. Examples of a spline cross-section include an involute and a square tooth. Typically, splines having an involute cross-section are smaller than square tooth splines, thereby leaving more of the functional shaft diameter of a shaft to carry a rotational torque load. Additionally, involute spline shapes force the female spline to center its profile on the male spline, thus coaxially aligning the shafts in the coupling with limited vibration. Square tooth splines are made without specialized cutters on an ordinary mill. However square teeth spline couplings do not align like involute teeth unless the clearance is reduced or the male and female fittings are forced together. However, reducing clearance or force fitting square teeth splines prevents ready assembly or disassembly.

SUMMARY OF THE INVENTION

In view of the foregoing, various embodiments of the present invention provide a submersible pumping system for pumping wellbore fluid. An example of a submersible pumping system includes a pump motor, an equalizer or seal section, a motor shaft having a splined end positioned within one end of the shaft coupling, and a driven shaft having a splined end positioned within an opposite end of the shaft coupling opposite to the motor shaft. The driven shaft is driven by the motor shaft via the splined shaft coupling. A centering profile is bored into the terminal end of the motor shaft and into the terminal end of the driven shaft to provide for dynamic aligning of the respective shafts. An alignment element is positioned within the shaft coupling. The alignment element includes a pair of opposite oriented centering guides coaxially engaging the centering profiles extending into the respective terminal ends of the motor shaft and driven shaft positioned within the shaft coupling. The pair of centering guides can comprise a pair of conically shaped protrusions extending from the upper and lower surfaces of the alignment element body. A resilient member may be included within the body of the alignment element. During rotation, the splined ends of the motor shaft and driven shaft are held substantially coaxial within the splined shaft coupling even when manufacturing has placed them at the outer limits of normal tolerances for square tooth splined shaft couplings. Advantageously, the splined ends of the motor and driven shafts can be easily separated from within the splined shaft coupling to allow for ready assembly and disassembly.

Various embodiments of the present invention can also include an electrical submersible pump (ESP) including a pump, a pump motor, an equalizer or seal section connected between the pump and the pump motor, a motor shaft mechanically affixed to the pump motor, and a driven shaft driven by the motor shaft. The motor shaft has a splined end portion including a plurality of elongate square tooth spines formed thereon, and has a terminal end portion including a tapered centering profile extending therein, being coaxial with an axis of the motor shaft. The driven shaft has a splined end portion including a plurality of elongate square tooth spines formed thereon, and has a terminal end portion including a tapered centering profile extending therein, being coaxial with an axis of the driven shaft. A splined shaft coupling assembly rotatingly couples the splined ends of the motor shaft and the driven shaft. An alignment element is mounted in portions of the splined shaft coupling assembly. The alignment element includes a tapered centering guide on one side that mates with the tapered centering profile on the motor shaft and a tapered centering profile on an opposite side that mates with the tapered centering profile on the driven shaft. The tapered centering profiles and the tapered centering guides are conical and of substantially same dimensions.

Various embodiments of the present invention also include methods of providing enhanced alignment of motor and driven shafts of a submersible pumping system having male square tooth splined ends. This is advantageously performed without reducing clearance between male and female square tooth splines or force fitting the male square tooth splines within the female square tooth splines. Such methods can provide for ready assembly or disassembly of the splined ends of a motor shaft and driven shaft from within a splined shaft coupling. An example of such a method can include the steps of providing a centering profile on each splined shaft end, mounting an alignment element within a splined shaft coupling configured for rotatingly coupling respective splined ends of the motor shaft and the driven shaft, and inserting the splined shaft ends into the splined shaft coupling and engaging oppositely oriented centering guides on the alignment element with the inner surfaces of the centering profiles on the splined shaft end. To facilitate engagement of the centering guides with the centering profiles to thereby maintain coaxial alignment of the shaft ends, each centering guides can comprise a conically shaped protrusion and each centering profile can comprise a conically shaped recess or for having a conically shaped entrance. Optionally, the compressible alignment element may comprise a tolerance ring.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 2b is an assembled view of the shaft coupling of FIG. 2a.

FIG. 3b is an assembled view of the shaft coupling of FIG. 3a.

FIG. 4b is an assembled view of the shaft coupling of FIG. 4a.

DETAILED DESCRIPTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

Figure 2A:
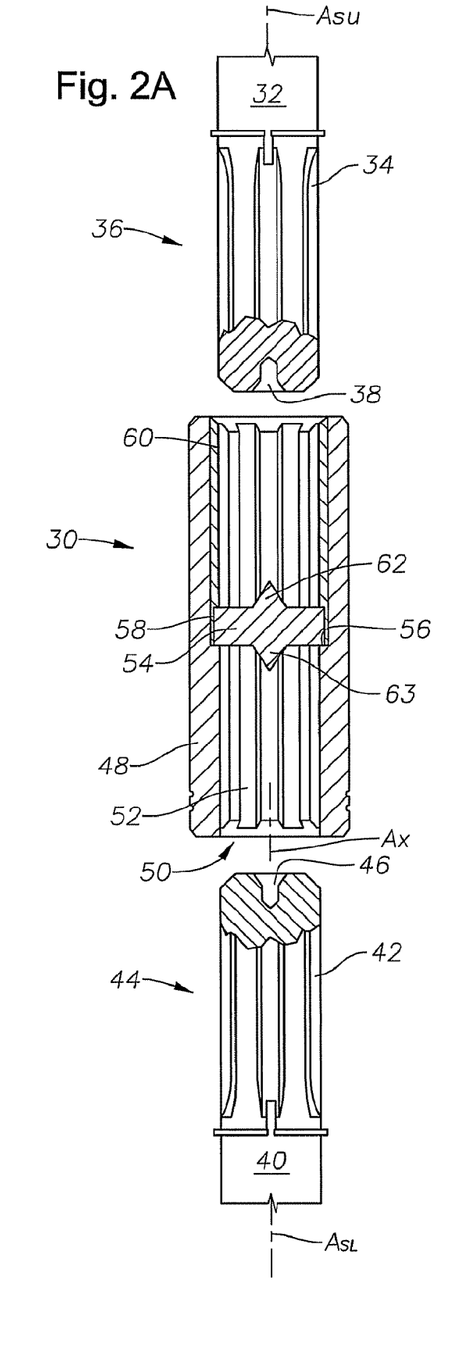
FIG. 2a is an exploded view of a shaft coupling for use with the system of FIG. 1.

The present disclosure includes a description of a submersible pumping system including a square tooth spline coupling with vibration control. The coupling disclosed herein provides sufficient clearance between the respective male and female splines providing ready assembly and disassembly. With reference now to FIG. 2a, an exploded side partial cutaway view of one embodiment of a coupling assembly and respective shafts is provided. As noted above, during operation of a pumping assembly, a motor shaft is powered by a pump motor, either directly or through a shaft coupling. The coupling assembly provides a manner of connecting the motor shaft to a driven shaft that drives rotating machinery. The coupling connection also transfers rotational energy between the motor and driven shaft, thus providing power for the rotating machinery. Thus with respect to couplings described herein, the term motor shaft includes any shaft mechanically coupled to the motor that is being coupled to a driven shaft. As such, embodiments exist where one end of a rotating shaft is a driven shaft coupled to a motor shaft and the other end of the rotating shaft is a motor shaft coupled to a driven shaft. Accordingly, ESP systems may include the couplings of the present disclosure at any shaft connection within the system and ESP systems may include multiple couplings of the present disclosure.

The coupling assembly 30 of FIG. 2a comprises an annular collar 48 with a bore 50 formed lengthwise therein. Female splines 52 extend axially along the bore 50 inner surface. The bore 50 diameter transitions at a point to form a shoulder 56 that is substantially perpendicular to the collar 48 axis $A_X$. An alignment element 54 is on the shoulder 56. In the embodiment shown, the alignment element 54 has a disc-like midsection and disposed in the collar 48 with its midsection axis (not shown) largely aligned with or parallel to the collar axis $A_X$. The alignment element 54 outer diameter exceeds the shoulder 56 inner diameter and its lower side abuts on the shoulder 56. The outer diameter fits closely in the bore 50. An insert or sleeve 60 is coaxially received within the collar 48 in the portion of the bore 50 having an increased diameter. The insert 60 extends from the upper surface of the alignment member 54 terminating at the upper end of the collar 48. The insert 60 is optionally threaded on its outer diameter to mate with corresponding threads provided on the collar 48 inner diameter. Female splines 52 are formed along the insert 60 inner diameter. Positioning the insert 60 against the alignment element 54 toward the shoulder 56, retains the alignment element 54 within the collar 48.

Centering guides (62, 63) are shown extending from the upper and lower surface of the alignment element 54. In this embodiment, the centering guides (62, 63) comprise conically shaped protusions. Above and below the coupling assembly 30 are an upper shaft 32 and lower shaft 40. The upper shaft 32 lower end 36 is provided with male splines 34 configured for coupling engagement with the female splines 52 of the coupling assembly 30. Similarly, the lower shaft 40 upper end 44 includes male splines 42 configured for coupling engagement with the female splines 52. The shafts (32, 40) are profiled on their terminal ends for centering engagement with the centering guides (62, 63) of the alignment element 54. In the embodiment shown, the profiling on the shafts comprises recesses or bores (38, 46) extending from the terminal mating tips of the shafts and substantially aligned with the respective axes ($A_{SH}$, $A_{SL}$) of the upper or counterbore lower shafts (32, 40). Each recess (38, 46) has a conical entry way with a taper matching the centering guides (62, 63). The recess and protrusion provide examples of guide profiles formed on the shaft ends and alignment element for engaging the shaft ends to the alignment element. During pumping operations, impellers in the pump create an axial thrust force in the pump shaft forcing the shafts (32, 40) together and engaging the centering guides (62, 63) with the recesses (38, 46).

Figure 2B:
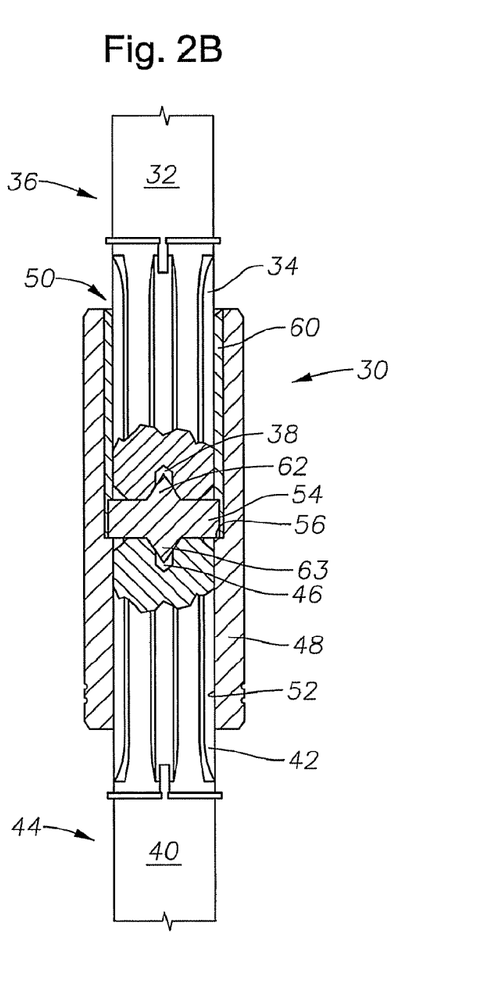

Referring now to FIG. 2b, an example of an assembled shaft coupling is shown in side cross-sectional view. The male splines 34 on the lower end 36 of the upper shaft 32 engage the female splines 52 and the upper shaft 32 bore 38 mates with the centering guide 62 that extends from the alignment element 54. Similarly, the male splines 42 on the upper end 44 of the lower shaft 40 are engaged with the female splines 52 of the collar 48 and the bore 46 on the upper terminal end of the shaft 40 mates with the centering guide 63 that extends from the opposite side of the alignment element 54. The upper shaft 32 and lower shaft 40 are aligned along a common axis within the collar 48 thus preventing shaft vibration when one of the shafts energizes the other.

Figure 3A:
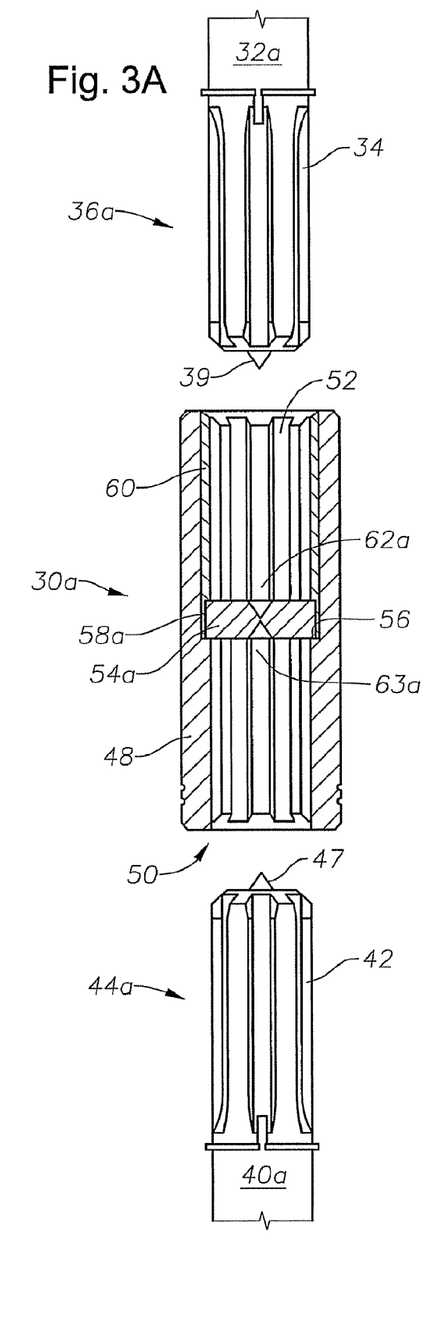
FIG. 3a is an exploded view of an alternative shaft coupling for use with the system of FIG. 1.
Figure 3B:
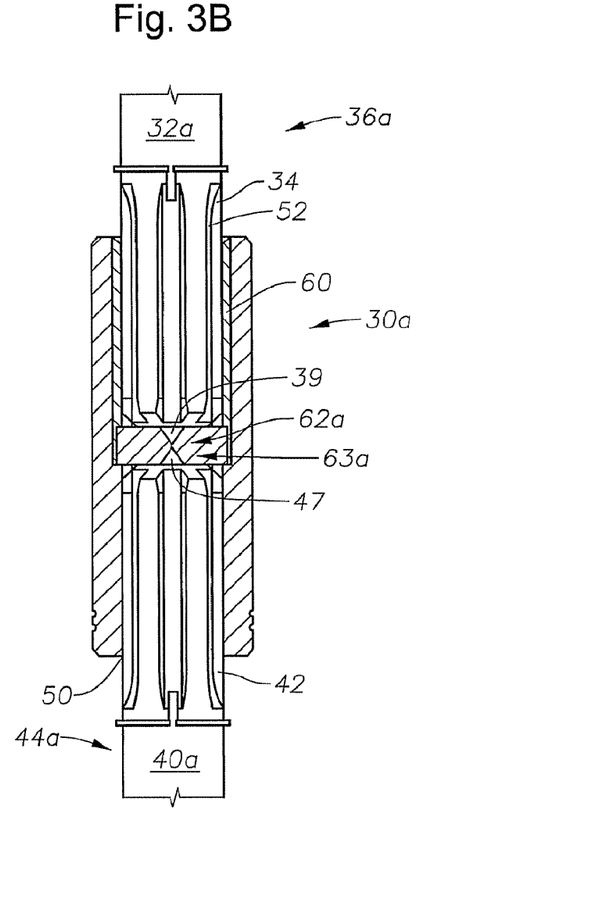

FIG. 3a shows an alternative embodiment of a shaft coupling 30a for coupling an upper shaft 36a to a lower shaft 44a. In this embodiment, the alignment element 54a has a largely disc-like cross-sectional area and is seated on the shoulder 56. The insert 60 retains the element 54a within the collar 48. The centering guides (62a, 63a) comprise a conical profile bored into the body of the alignment element 54a. Similarly, the terminal tips of the upper shaft 36a and lower shaft 44a include conically profiled protrusions (39, 47) formed to engaged the bores of the centering guides (62a, 63a). FIG. 3b illustrates the assembled shaft coupling 30a and engagement of the protrusions (39, 47) with the centering guides (62a, 63a). This configuration also controls shaft vibration during transmission of torque through the coupling 30a. The profiles on the alignment elements and the terminal tips of the shafts are not limited to the figures described herein, but can include other shapes such as conical, concave, convex, spherical or other curved surfaces. Additionally, cylindrical profiles with may be employed and may include rounded tips on the cylinder end.

Figure 4A:
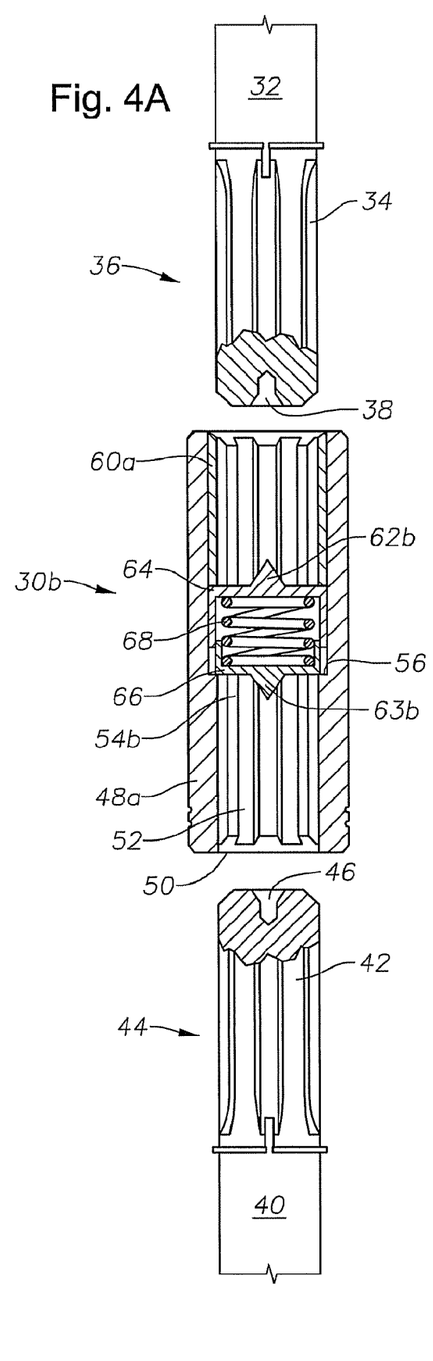
FIG. 4a is an exploded view of an alternative shaft coupling for use with the system of FIG. 1.

Yet another embodiment of a shaft coupling 30b is provided in side cross-sectional view in FIG. 4a. In this embodiment, the centering guides 62b and centering guide 63b comprise a raised profile on the respective upper and lower sides of the alignment element 54b. The alignment element 54b comprises an upper housing 64, a lower housing 66, and a resilient member housed within the upper and lower housings (64, 66). One example of a resilient member is a spring 68. In this embodiment, the upper and lower housing (64, 66) both comprise a generally cup-like structure having a closed base that is largely perpendicular to the axis of the collar 48a. The housings have sides extending from the base towards an open end; the sides lie generally concentric with the axis $A_X$ of the collar 48a. The upper housing 64 inner diameter is greater than the lower housing 66 outer diameter allowing insertion of the lower housing 66 into the upper housing 64 in telescoping relation. The spring 68 provides a resilient force for urging the upper and lower housing (64, 66) apart.

Figure 4B:
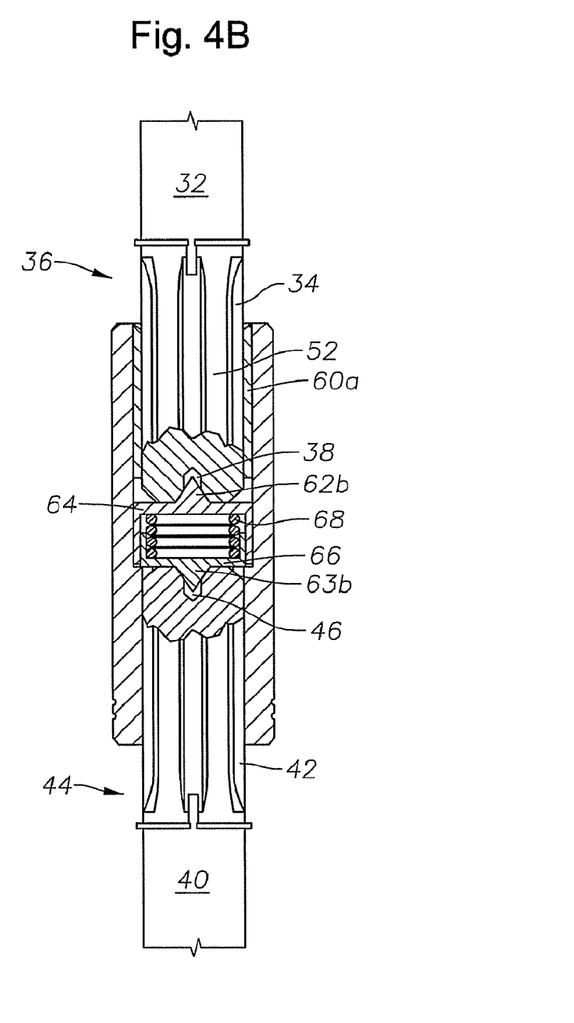

As shown in FIG. 4b, in some embodiments, a vertical force may move the shaft (32, 40) toward one another and pushes on one of the upper or lower housing (64, 66), thereby compressing the spring 68 there between. One of the advantages of this embodiment is an axial force from one of the shafts (32, 40) is fully absorbed by the spring 68 and not transferred to the other or any other adjacent shaft within a pumping system. Moreover, the resilient nature of the spring 68 can force the housings (64, 66) apart upon absence of the vertical force while continuing axial alignment of the shafts (32, 40) during operation of the pumping system. Because rotational shafts in an ESP seal portion typically are not subjected to axial thrust, the resilient feature may be useful for these couplings. As shown, the housings (64, 66) have protrusions profiled on their respective outer surfaces formed to match recesses (38, 46) on the shafts (32, 40). However, the housings (64, 66) could be fashioned to include recesses and the shafts (32, 40) having corresponding protrusions.

Figure 5:
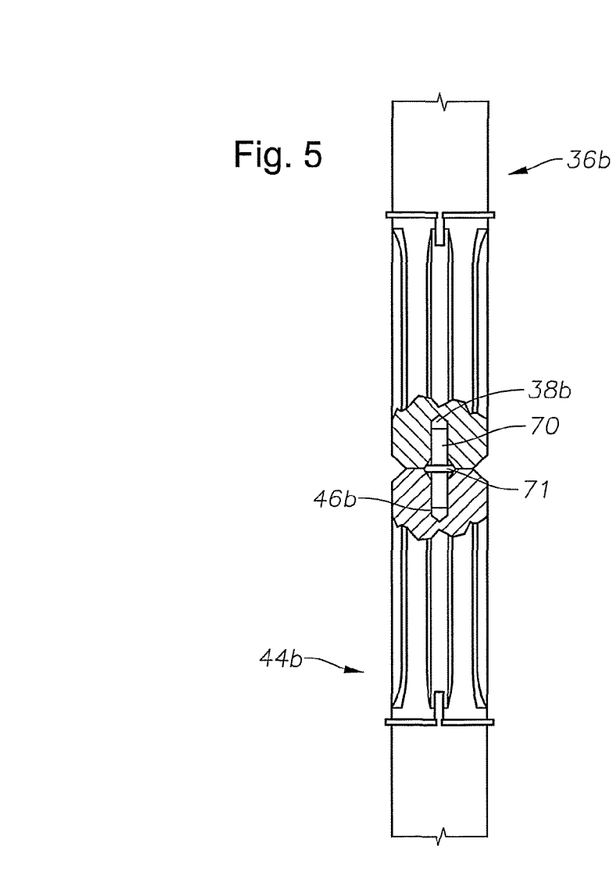
FIG. 5 is a side partial cut-away view of an alternative shaft coupling for use with the system of FIG. 1.

Another embodiment illustrating ESP shaft coupling is provided in a side partial cut-away view in FIG. 5. Here an upper shaft 36b and lower shaft 44b are aligned with a retaining pin 70 that extends from a bore 38b in the lower terminal end of the upper shaft 36b into a corresponding bore 46b in the upper terminal end of the lower shaft 44b. The retaining pin 70 may include an annular shoulder 71 radially disposed around the body of the pin 70 approximately at its midsection. To accommodate the retaining pin 70, the bores (38b, 46b) are formed deeper into the shafts (36b, 44b) than the bores (38, 46) illustrated in FIGS. 2a and 2b.

Figure 6:
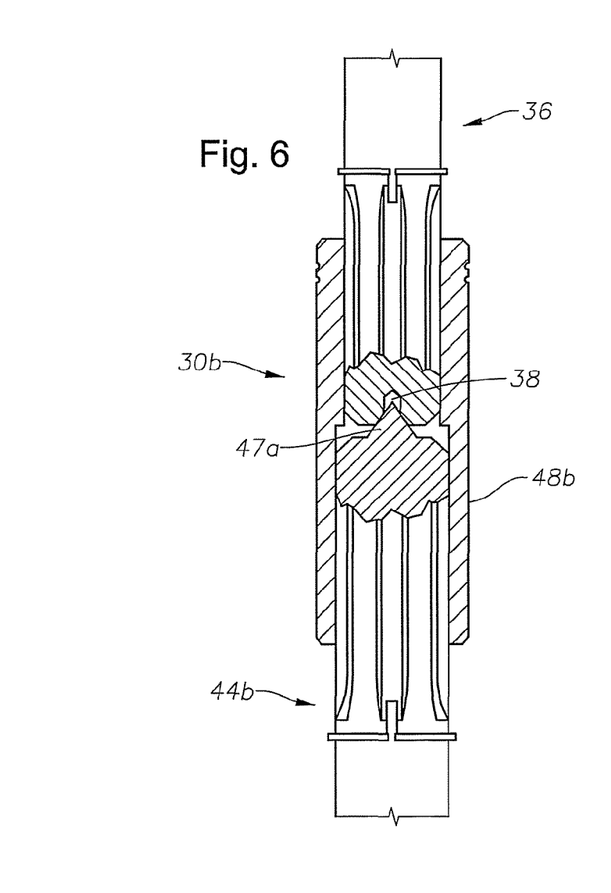
FIG. 6 is a side partial cut-away view of an alternative shaft coupling for use with the system of FIG. 1.

A coupling assembly is presented in side partial cross sectional view in FIG. 6 that combines concepts described above. An upper shaft 36 with a bore 38 is disposed within a collar 48b into coaxial alignment with a corresponding lower shaft 44b. A protrusion 47a extends from the lower shaft 44b upper terminal end into the bore 38 and is retained therein for coaxial alignment of the shafts (36, 44b). The protrusion 47a of FIG. 6 is similar to the protrusion 47 of FIGS. 3a and 3b, but has increased dimensions, including an increased length, to ensure mating cooperation with the bore 38. The collar 48b inner diameter is smaller at its upper end to match the upper shaft 36 outer diameter. The collar 48b can be machined or forged as a uni-body configuration, or reduced with an insert (not shown) similar to the collar 48 of FIGS. 2a-3b.

Figure 7:
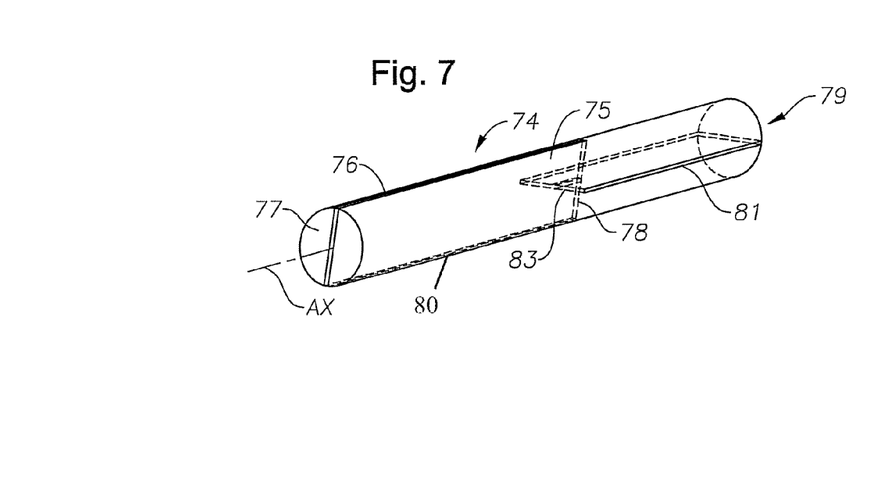
FIG. 7 is a perspective view of an embodiment of an alignment member.
Figure 7A:
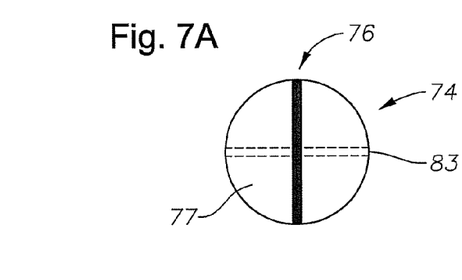
FIG. 7A is an end sectional view of the alignment member of FIG. 7.
Figure 8:
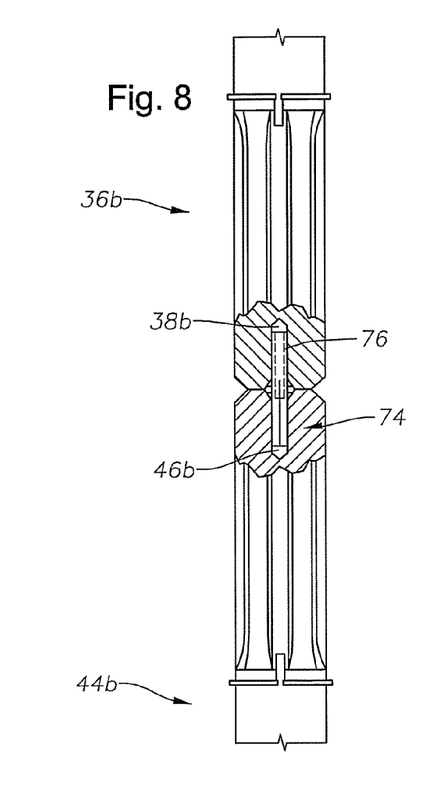
FIG. 8 is a side partial sectional view of the alignment member of FIG. 7 engaged with opposing shafts.

An example of an alternative shaft coupling is provided in FIGS. 7 and 8. FIG. 7 depicts split pin 74 in perspective view. The embodiment of the split pin 74 illustrated is an elongated member having a substantially cylindrical shaped body 75, however the split pin 74 can also have cross sectional shapes with multiple sides. In the embodiment of FIG. 7, a vertical slot 76 initiates from a first end 77 of the body 75 extending through the body 75 to a vertical terminal end 78. Projecting from the body 75 second end 79 is a horizontal slot 81 that extends past the vertical terminal end 78 to a horizontal terminal end 83. FIG. 7 illustrates the first end 77 in forward looking view depicting an optional filler material 80 inserted within the slot 76. The filler material 80 should compress to allow pin 74 insertion and may include a fiber type material, such as cotton, felt, or fiberglass. Other materials include foam, cork, polymers, elastomeric polymers, and the like.

With reference now to FIG. 8, an example of a shaft coupling is provided in a side partial sectional view. Here an embodiment of the split pin 74 is coaxially disposed between an upper end 44b and a lower end 36b. Similar to the embodiment of FIG. 5, the split pin 74 has an end extending into the bore 38b of the lower end 36b and an opposite end extending into the bore 46b of the upper end 44b. The pin 74 ends can have an outer dimension approximately the same or greater than the bores 38b, 46b. The slots 76, 81 enable the ends 77, 79 to be compressed and inserted within the bores 38b, 46b. Forming the split pin 74 from an elastic material, such as steel, results in the pin 74 ends outwardly pushing against the inner circumference of the bores 38b, 46b; this couples the pin 74 to the ends of the shafts. The bores 38b, 46b being substantially aligned with the respective shaft axes shaft, provides alignment of the shaft ends 38b, 44b during use when the split pin 74 is coupled with the bores 38b, 46b.

Figure 9:
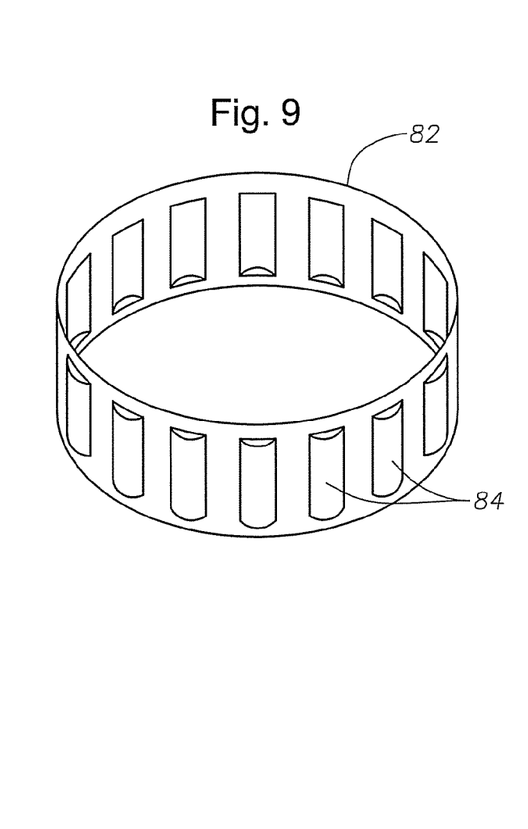
FIG. 9 is a perspective view of an embodiment of a tolerance ring.
Figure 10:
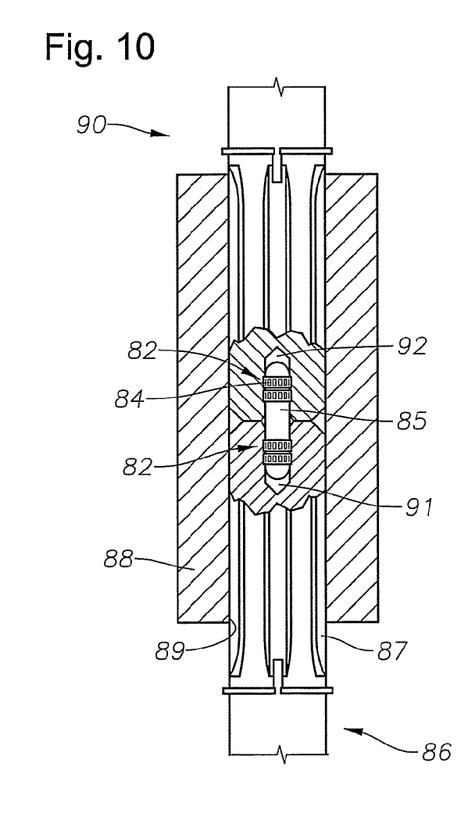
FIG. 10 is a side partial sectional view of the tolerance ring of FIG. 9 disposed between a shaft and a shaft coupling.

Another optional compressive alignment element is illustrated in FIGS. 9 and 10. With reference to FIG. 9, an annular sleeve 82 is shown in perspective view. The annular sleeve 82 is a tubular member having a corrugated outer peripheral surface formed by protrusions 84 extending therefrom. Optionally, the protrusions 84 may extend from the sleeve 82 inner surface, or from both the inner and outer surfaces. The protrusions 84 are preferably formed from an elastic material, such as steel, that is able to be deformed and then return to its previous shape and also exert a resistive force while in the deformed state. An example of an annular sleeve 82 suitable for use as herein disclosed is a tolerance ring, that may be purchased from Rencol, 85 Route 31 North, Pennington, N.J. 08534, Tel: 609-745-5000, Fax: 609-74.5-5012, www.usatoterancerings.com.

FIG. 10 illustrates a side partial sectional view of a shaft 86 having splines 87 formed on the end of the shaft 86. An optional collar 88 is depicted on the end of the shaft 86, having on its inner circumference a corresponding profile of splines 89 for mating with the splines 87 on the shaft 86. A pin 85 is pictured inserted into bores 91, 92 formed on the ends of the shafts 86, 90 to align and stabilize the shafts 86, 90 during rotation. An embodiment of the annular sleeve 82, with protrusions 84, circumscribes the pin 85 ends to enhance coupling stability between the pin 85 and bores 91, 92. The protrusions 84 on the annular sleeve 82 are in temporary deformable compression when the pin 85 is in the bores 91, 92. The elasticity of the protrusions 84 couples the pin 85 within each bore 91, 92 thereby aligning the ends of the shafts 86, 92. As shown, two annular sleeves 82 are provided on each pin 85 end, but other arrangements are possible. For example, a pin 85 may have a single sleeve 82 on one end with a pair of sleeves 82 on its opposite end. Embodiments exist with more than two sleeves 82 on an end of a pin 85.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims. While the invention has been shown in only one of its forms, it should be apparent to those skilled in the art that it is not so limited but is susceptible to various changes without departing from the scope of the invention.

That claimed is:

1. A submersible pumping system for pumping wellbore fluid, comprising:
    a pump motor;
    a pump;
    an equalizer or seal section connected between the pump and the pump motor;
    a splined shaft coupling;
    a motor shaft having a splined end positioned within one end of the shaft coupling, the motor shaft having a terminal end comprising a centering profile extending therein, the centering profile comprising at least portions of a recess or bore extending axially into the terminal end of the motor shaft;
    a driven shaft having a splined end positioned within an opposite end of the shaft coupling opposite to the motor shaft, the driven shaft having a terminal end comprising a centering profile extending therein, the centering profile comprising at least portions of a recess or bore extending axially into the terminal end of the driven shaft, the respective splined ends of the motor shaft and driven shall being substantially coaxial within the splined shaft coupling, the driven shaft being, driven by the motor shaft via the spline shaft coupling; and
    an alignment element coupled within the shaft coupling, the alignment element including a midsection having a midsection diameter and a pair of opposite oriented centering guides extending from a corresponding pair of opposite faces of the midsection and coaxially engaging the centering profiles extending into the respective terminal ends of the motor shaft and driven shaft positioned within the shaft coupling, a diameter of each of the pair of opposite oriented centering guides being smaller than the midsection diameter to form the corresponding pair of opposite faces of the midsection, the terminal end of the motor shaft landing upon a first of the pair of opposite faces of the midsection when receiving a first of the pair of centering guides, and the terminal end of the driven shaft landing upon a second of the pair of opposite faces of midsection when receiving a second of the pair of centering guides.

2. The submersible pumping system as defined in claim 1, wherein the pair of centering guides comprise conically shaped protrusions extending from first and the second faces of the pair of opposite faces of the midsection of the alignment element, respectively.

3. The submersible pumping system as defined in claim 2, wherein the recess or bore of each terminal end of the respective motor and driven shafts are each profiled with a conically shaped entryway configured to provide centering engagement with the centering guides of the alignment element.

4. The submersible pumping system as defined in claim 1, wherein the alignment element comprises upper and lower housings that telescope relative to one another, each housing carrying one of the pair of centering profiles, a resilient member located between the upper housing and the lower housing urging the upper housing and the lower housing apart.

5. The submersible pumping system as defined in claim 1, wherein the alignment element comprises a disk portion and wherein the shaft coupling comprises a shoulder formed in the splined shaft coupling, the system further comprising:
    a threaded sleeve secured within the splined shaft coupling, the threaded sleeve positioned in contact with the disk portion of the alignment element, the disk portion being secured between the shoulder and the sleeve.

6. The submersible pumping system as defined in claim 1, wherein the splined end of the motor and driven shafts each comprise a plurality of elongate square tooth splines, the submersible pumping system further comprising:
a substantially cylindrical shape annular insert positioned within the splined shaft coupling, the insert comprising a plurality of elongate female square tooth splines formed along an inner diameter of a bore extending through the insert, the elongate female square tooth splines configured for coupling engagement with the elongate male square tooth splines on the one end of the driven shaft.

7. The submersible pumping system as defined in claim 6, wherein the cylindrical shaped annular insert is positioned to retain the alignment element within a counter bore of the splined shaft coupling.

8. The submersible pumping system as defined in claim 1, wherein the midsection of the alignment element has a disk shape.

9. The submersible pumping system as defined in claim 8, wherein the pair of centering guides comprise conically shaped protrusions, wherein the recess Or bore of each terminal end of the respective motor and driven Shafts are each profiled with a conically shaped entryway configured to provide centering engagement with the centering guides of the alignment element, and wherein the terminal ends of the motor shaft and the driven shaft each have complementing surfaces substantially complementing the shape of the motor shaft-facing and driven shaft-facing surfaces of the alignment element, respectively.

10. The submersible pumping system as defined in claim 1, wherein the splined shaft coupling comprises an annular collar having a first bore positioned to receive the motor shaft and a counter bore positioned to receive the driven shaft, a diameter of the counter bore being larger than a diameter of the bore to form a shoulder at a juncture therebetween.

11. The submersible pumping system as defined in claim 10, wherein the midsection of the alignment element is disk-shaped, wherein an outer diameter of the disk-shaped midsection of the alignment element is larger than an inner diameter of the shoulder, and wherein outer peripheries of the disk-shaped midsection of the alignment elements land upon the shoulder.

12. The submersible pumping system as defined in claim 11, further comprising an annular insert positioned within the, counter bore and in contact with a driven shaft-facing surface of the alignment element to retain the alignment element within the counter bore of the annular collar.

13. The submersible pumping system as defined in claim 12, wherein the annular insert is a cylindrical shaped annular insert having a bore sized to receive the driven shaft, wherein the splined end of the driven shaft comprises a plurality of elongate square tooth splines, and wherein the cylindrical shaped annular insert comprises a corresponding plurality of elongate female square tooth splines formed along an inner diameter of the annular insert and configured for coupling engagement with the elongate male square tooth splines on the one end of the driven shaft.

14. An electrical submersible pump (ESP), comprising:
a pump;
a pump motor:
an equalizer or seal section connected between the pump and the pump motor;
a motor shaft mechanically affixed to the pump motor, the motor shaft having a splined end portion comprising a plurality of elongate square tooth spines formed thereon, and a terminal end portion comprising a tapered centering profile extending therein, being coaxial with an axis of the motor shaft;
a driven shaft having a splined end portion comprising a plurality of elongate square tooth spines formed thereon, and a terminal end portion comprising a tapered centering profile extending therein, being coaxial with an axis of the driven shaft;
a splined shaft coupling assembly rotatingly coupling respective splined ends of the motor shaft and the driven shaft; and
an alignment element mounted in portions of the splined shaft coupling assembly, the alignment element having a midsection, a first tapered centering guide on one side that mates with the tapered centering profile on the motor shaft, and a second tapered centering guide on an opposite side that mates with the tapered centering profile on the driven shaft, the first and the second tapered centering guides each having a base with a diameter being substantially smaller than a diameter of the midsection to form a pair of axially oppositely facing surfaces, the terminal end portion of the motor shaft landing upon a first of the pair of axially oppositely facing surfaces of the midsection when receiving the first tapered centering guide, and the terminal end portion of the driven shaft landing upon a second of the pair of axially oppositely facing surfaces of the midsection when receiving the second tapered centering guide.

15. The ESP as defined in claim 14, wherein the tapered centering profiles and the tapered centering guides are conical and are of substantially same dimensions.

16. The ESP as defined in claim 15, wherein the alignment element comprises an upper housing and a lower housing, each housing having one of the tapered centering guides, and a spring member located between the upper housing and the lower housing urging the upper housing and the lower housing apart.

17. The ESP as defined in claim 14, wherein the alignment element comprises a disk portion, and wherein the splined shaft coupling assembly comprises:
an annular collar having a shoulder formed therein; and
a threaded sleeve secured within the annular collar, the threaded sleeve positioned in contact with the disk portion of the alignment element, the disk portion being secured between the shoulder and the sleeve.

18. The ESP as defined in claim 14, wherein the plurality of elongate square tooth splines on the splined end portions of the motor and driven shafts are male square tooth splines, and wherein the splined shaft assembly comprises:
an annular collar; and
a substantially cylindrical shape annular insert positioned within the annular collar, the insert comprising a plurality of elongate female square tooth splines formed along an inner diameter of a bore extending through the insert, the elongate female square tooth splines configured for coupling engagement with the elongate male square tooth splines.

19. The ESP as defined in claim 14,
wherein the splined shaft coupling assembly comprises an annular collar having a first bore positioned to receive the motor shaft and a counter bore positioned to receive the driven shaft, a diameter of the counter bore being larger than a diameter of the bore to form a shoulder at a juncture therebetween;
wherein the midsection of the alignment element comprises a disk-shaped midsection, an outer diameter of the disk-shaped midsection of the alignment element being larger than an inner diameter of the shoulder, and outer peripheries of the disk-shaped midsection of the alignment elements land upon the shoulder; and wherein the splined shaft coupling assembly further comprises an annular insert positioned within the counter bore and in contact with a driven shaft-facing surface of the alignment element to retain the alignment element within the counter bore of the annular collar.

20. A method of providing enhanced alignment of motor and driven shafts of a submersible pumping system having male square tooth splined ends without reducing clearance between male and female square tooth splines or force fitting the male square tooth splines within the female square tooth splines to thereby provide for ready assembly or disassembly, the method comprising the steps of:

providing a centering profile on each splined shaft end;

mounting an alignment element within a splined shaft coupling configured for rotatingly coupling respective splined ends of the motor shaft and the driven shaft, the alignment element including a midsection having a midsection diameter and a pair of opposite oriented centering guides extending from a corresponding pair of axially oriented opposite faces of the midsection, a diameter of each of the pair of opposite of oriented centering guides being smaller than the midsection diameter to form the corresponding pair of opposite faces of the midsection; and inserting the splined shaft ends into the splined shaft coupling and engaging each centering guide on the alignment element with the inner surfaces of a corresponding one of the centering profiles on splined shaft ends, the spline shaft end of the motor shaft landing upon a first of the pair of faces of the midsection when receiving a first of the pair of centering guides, and the splined shaft end of the driven shaft landing upon a second of the pair of faces of the midsection when receiving a second of the pair of centering guides.

21. The method as defined in claim 20, wherein each centering guide comprises a protrusion and each centering profile comprises a recess configured to receive, one of the respective protrusions; and wherein the shaft ends are maintained coaxial within the coupling by the engagement of the profiles with the alignment element.

22. The method as defined in claim 20, wherein the midsection of the alignment element comprises a disk member bounded by the pair of faces of the midsection and having a width extending along a lateral axis being substantially larger than a length thereof, the method further comprising mounting the alignment element so that the lateral axis is oriented perpendicular to the orientation of the splined shaft coupling.

* * * * *

UNITED STATES PATENT AND TRADEMARK OFFICE
CERTIFICATE OF CORRECTION

PATENT NO.         : 8,591,205 B2                                         Page 1 of 1
APPLICATION NO.    : 13/657986
DATED              : November 26, 2013
INVENTOR(S)        : Donn J. Brown et al.

It is certified that error appears in the above-identified patent and that said Letters Patent is hereby corrected as shown below:

In the Claims

Column 8, line 23, claim 1, delete the "," between "being" and "driven"
Column 9, line 20, claim 9, delete "Or" and insert -- or -- before "bore"
Column 9, line 21, claim 9, delete "Shafts" and insert -- shafts --
Column 9, line 44, claim 12, delete the "," between "the" and "counter"
Column 9, line 64, claim 14, delete "spines" and insert -- splines --
Column 10, line 2, claim 14, delete "spines" and insert -- splines --

Signed and Sealed this
Twenty-sixth Day of August, 2014

Michelle K. Lee
*Deputy Director of the United States Patent and Trademark Office*